United States Patent
Endo et al.

(10) Patent No.: US 9,539,884 B2
(45) Date of Patent: Jan. 10, 2017

(54) DOOR SASH

(71) Applicant: HONDA MOTOR CO., LTD., Tokyo (JP)

(72) Inventors: Satoshi Endo, Saitama (JP); Hiromu Inoue, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/026,811

(22) PCT Filed: Sep. 9, 2014

(86) PCT No.: PCT/JP2014/073766
§ 371 (c)(1),
(2) Date: Apr. 1, 2016

(87) PCT Pub. No.: WO2015/049960
PCT Pub. Date: Apr. 9, 2015

(65) Prior Publication Data
US 2016/0221422 A1     Aug. 4, 2016

(30) Foreign Application Priority Data
Oct. 4, 2013   (JP) .................................. 2013-208925

(51) Int. Cl.
*B60J 5/00*     (2006.01)
*B60J 5/04*     (2006.01)
*B60R 13/04*    (2006.01)

(52) U.S. Cl.
CPC .............. *B60J 5/0402* (2013.01); *B60R 13/04* (2013.01)

(58) Field of Classification Search
CPC .............................. B60J 5/0402; B60R 13/04
(Continued)

(56) References Cited

U.S. PATENT DOCUMENTS

| 2001/0015035 A1* | 8/2001 | Nozaki | .................... B60J 10/21 49/440 |
| 2004/0130179 A1* | 7/2004 | Masunaga | .............. B60J 5/0402 296/146.5 |

(Continued)

FOREIGN PATENT DOCUMENTS

JP       2010-247771        11/2010

OTHER PUBLICATIONS

International Search Report, Date of mailing: Dec. 16, 2014 (Dec. 16, 2014).

*Primary Examiner* — Joseph D Pape
(74) *Attorney, Agent, or Firm* — Rankin, Hill & Clark LLP (57) ABSTRACT

A door sash joined to a door body in a simple manner is provided. A door sash includes a design part, a tubular part, and a connection part. The connection part includes a first connection part continuous to the design part, a second connection part continuous to the tubular part, and a stepped part between the first connection part and the second connection part. The second connection part is closer to the inner side of the door opening than the first connection part. A vicinity of one end of the plate material in a cross section view includes an overlapping part forming a closed cross section by overlapping on the second connection part from the outside. The surface of the overlapping part is closer to the inner side of the door opening than the surface of the first connection part or flush with the surface of the first connection part.

16 Claims, 8 Drawing Sheets

(58) Field of Classification Search
USPC .......................................... 296/146.9, 146.5
See application file for complete search history.

(56) References Cited

U.S. PATENT DOCUMENTS

| | | | | |
|---|---|---|---|---|
| 2005/0223648 A1* | 10/2005 | Takeuchi | ............... | B60J 5/0402 49/502 |
| 2009/0115220 A1* | 5/2009 | Takeuchi | ............... | B60J 5/0402 296/146.6 |
| 2012/0192498 A1* | 8/2012 | Fukui | ........................ | B60J 5/00 49/504 |

\* cited by examiner

<COMPARATIVE EXAMPLE>
FIG.8A

FIG.8B

DOOR SASH

TECHNICAL FIELD

The present invention relates to a door sash attached to a vehicle.

BACKGROUND ART

Conventionally, a door sash for accommodating an outer peripheral end part of a door glass is known. The door sash is a polygonal line-shaped frame fixed to a door body, and is manufactured by roll forming a band-shaped plate material.

For example, Patent Literature 1 discloses a door sash including: a tubular part formed in a D-shape in a cross-sectional view; an overlapping part extending from the tubular part; and design parts formed to respectively project from the overlapping part in the opposite lateral directions.

The overlapping part includes a first overlapping part in which the plate material is overlapped in two layers and a second overlapping part in which the plate material is overlapped in three layers. The second overlapping part is formed by further overlapping an end portion of the plate material onto the plate material (overlapped in two layers) extending from the first overlapping part.

CITATION LIST

Patent Literature

Patent Literature 1: Japanese Patent Application Publication No. 2010-247771

SUMMARY OF INVENTION

Technical Problem

In many cases, a door sash is attached to an inner panel of a door body by spot welding with the overlapping parts pressed to the inner panel.

According to the invention disclosed in Patent Literature 1, a step difference corresponding to one sheet of the plate material is formed between the first overlapping part in which the plate material is overlapped in two layers, and the second overlapping part in which the plate material is overlapped in three layers. Therefore, there is a problem that when the overlapping part is pressed onto the inner panel as is, the overlapping part and the inner panel do not come into close contact with each other due to a gap produced by the step difference between the overlapped part and the inner panel.

Here, the problem of the step difference may be solved by performing a stamp processing of an end portion of the door sash so as to make surfaces of the first overlapping part and the second overlapping part flush with each other. Also, depending on the shape of the step difference between the first and second overlapping parts, stamp processing may be performed for the inner panel of the door body.

However, there is a problem that additional time and cost are required for performing such a processing additionally.

In view of the foregoing problems, it is an object of the present invention to provide a door sash that may be joined into the door body in a simple manner.

Solution to Problem

As means for solving the problem, a door sash configured to be attached to a door body openably and closably installed on a door opening of a vehicle body and formed of one sheet of a plate material, is characterized in that the door sash includes: a design part having a surface on a vehicle outer side exposed or covered with a decorative member; a tubular part positioned closer to a vehicle inner side than the design part, the tubular part having a closed cross section; and a connection part connecting the design part and the tubular part with each other, in which the connection part includes a first connection part continuous to the design part, a second connection part continuous to the tubular part, and a stepped part provided between the first connection part and the second connection part, the second connection part is positioned closer to an inner side of the door opening than the first connection part, a vicinity of one end of the plate material in a cross-sectional view includes an overlapping part forming the closed cross section by overlapping on the second connection part from an outer side of the door opening, and a surface of the overlapping part is positioned closer to the inner side of the door opening than a surface of the first connection part, or flush with the surface of the first connection part.

With such a configuration, the second connection part is positioned closer to the inner side of the door opening than the first connection part. The surface of the overlapping part is positioned closer to the inner side of the door opening than the surface of the first connection part, or flush with the surface of the first connection part. Therefore, the overlapping parts do not become an obstacle when joining (welding) the first connection part by pressing onto the inner panel of the door body. That is, when pressed onto the door body, the first connection part comes into close contact with the door body and can be joined as is. Thus, the present invention provides a door sash capable of being joined to the door body in a simple manner.

In addition, in the door sash, it is preferable that an end portion of the overlapping part on a vehicle outer side abuts on the stepped part.

With such a configuration, when manufacturing the door sash, the overlapping parts can be easily positioned by bringing an end portion of the overlapping part on the vehicle outer side into contact with the step difference section. Also, with the door body closed, the tubular part can receive a reaction force from the inside of the vehicle at the step difference section as well. Thus, rigidity of the door sash as a whole can be enhanced.

In addition, in the door sash, it is preferable that the vicinity of one end of the plate material in the cross-sectional view is joined to the second connection part, and is not joined to the first connection part.

With such a configuration, when joining the vicinity of one end of the plate material to the second connection part, at least the first connection part comes into close contact with the inner panel of the door body, and thereby attaching operation of the door sash can be simplified.

Also, the door sash can be brought into close contact with and joined to the door body by a simple processing of cutting a portion of the plate material interfering with the door body without joining the vicinity of one end of the plate material to the second connection part.

In addition, in the door sash, it is preferable that the second connection part includes a vicinity of another end of the plate material, and a section where the vicinity of the other end and the overlapping part are overlapped with each other is joined.

With such a configuration, a section where the vicinity of one end of the plate material and the vicinity of the other end thereof are overlapped with each other is joined. Thus, vicinities of both ends of the plate material can be fixed by one joining operation and thereby the number of joining operations can be reduced.

In addition, in the door sash, it is preferable that the vicinity of the other end of the plate material extends to the inside of the closed cross section of the tubular part, and a section where the vicinity of the other end and the overlapping part are overlapped with each other is joined.

With such a configuration, the vicinity of the other end of the plate material extending to the inside of a closed cross section of the tubular part and the overlapping part are joined to each other. Thus, the tubular part can be formed so as to produce a large area of the closed cross section, and thereby rigidity of the door sash as a whole can be enhanced.

In addition, in the door sash, it is preferable that the second connection part further includes the plate material continuous to the tubular part with the vicinity of the other end therebetween along with the overlapping part, and a section where at least three layers including the overlapping part are overlapped with each other is joined.

With such a configuration, a section where the plate material is overlapped in three layers including the vicinity of the other end of the plate material and the overlapping part is joined, and thereby rigidity of the joined section can be enhanced. Also, the joining can prevent tramping in the vicinity of the other end of the plate material in an effective manner.

In addition, in the door sash, it is preferable that a housing part having a U-shape in the cross-sectional view for housing a run channel is formed by a wall part of the tubular part on the vehicle outer side, the connection part, and the design part, and the tubular part projects closer to the design part than the vicinity of the other end of the plate material.

With such a configuration, a space of a housing part for holding the run channel can be secured by adjusting a projection of the tubular part from another end of the plate material toward the design part. Also, a predetermined area can be secured for a closed cross section of the tubular part as well, and thereby rigidity of the door sash as a whole can be enhanced.

Advantageous Effects of Invention

The present invention provides a door sash capable of being joined to the door body in a simple manner.

DESCRIPTION OF EMBODIMENTS

Modes for carrying out the present invention (hereinafter referred to as embodiments) are described in detail with reference to the accompanying drawings as appropriate.

Hereinafter, description is made, as an example, on the basis that the front door FD and rear door RD (see FIG. 1) are hinge doors. When describing the direction, vertical direction, longitudinal direction, vehicle inner side and vehicle outer side are defined such as illustrated in FIG. 2; that is, the forward direction is a direction where a vehicle C travels, and the vertical upward direction is an upward direction. For example, when describing a left front door FD, a right side to the front door FD is referred to as "vehicle inner side", and a left side to the front door FD is referred to as "vehicle outer side" (for example, see FIG. 2). Also, the direction defining "vehicle inner side" and "vehicle outer side" may be referred to as "inward and outward directions of vehicle C".

First Embodiment

Configuration of Door Sash

Figure 1:
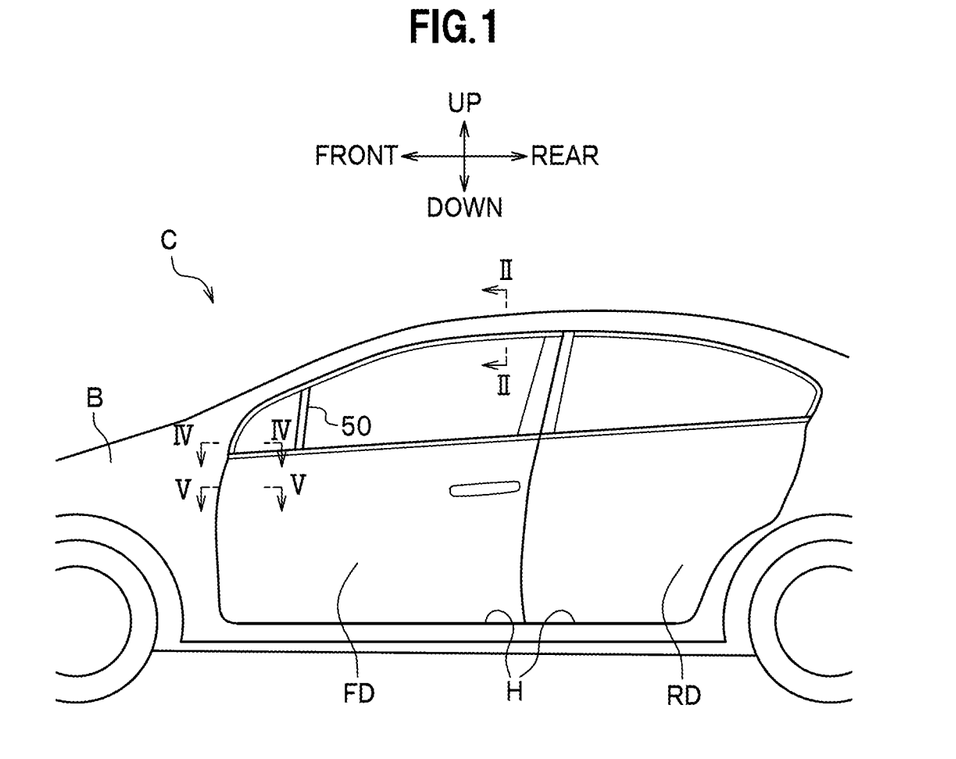
FIG. 1 is a left side view of a vehicle including a door sash according to a first embodiment of the present invention.
Figure 2:
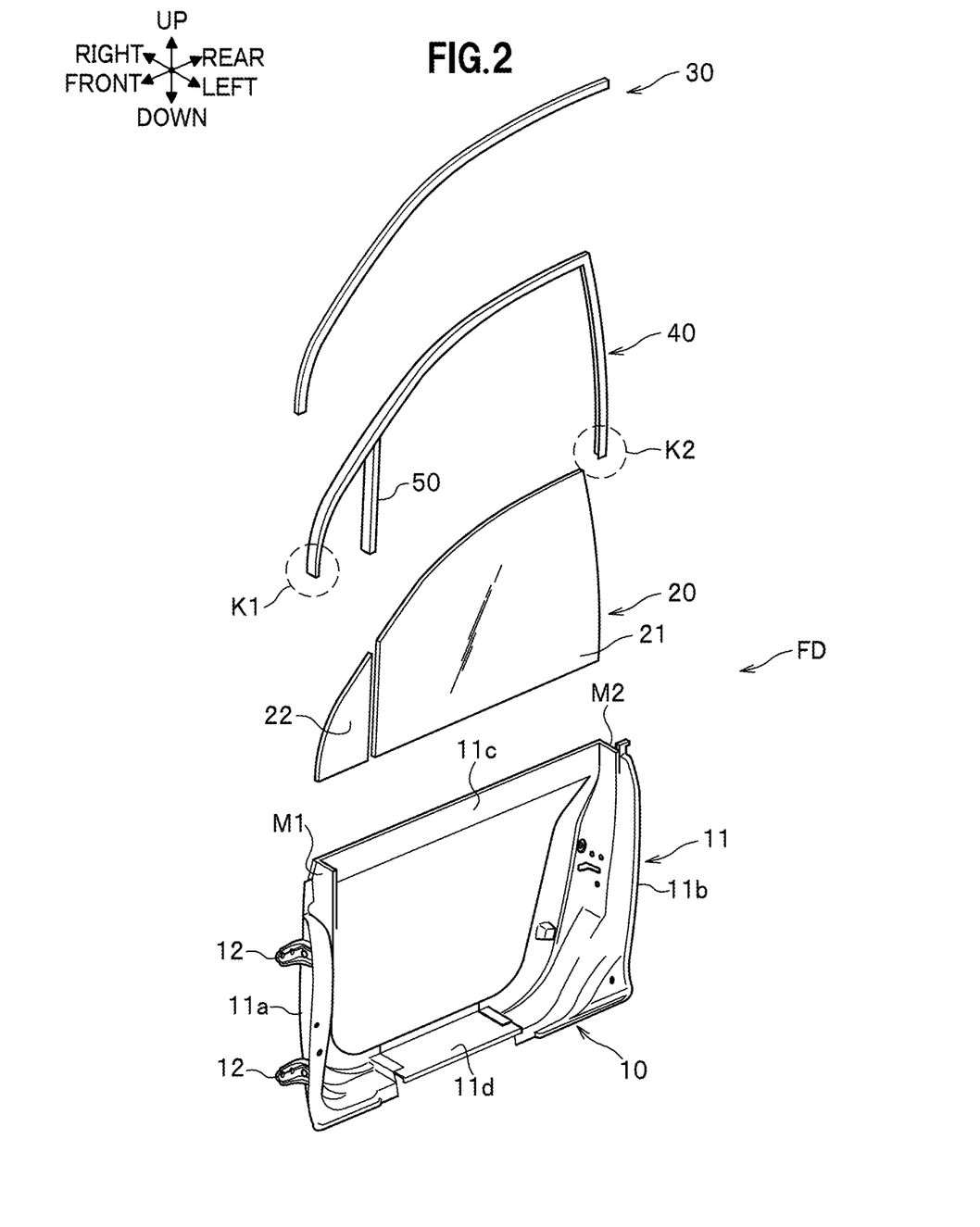
FIG. 2 is an exploded perspective view (a perspective view from the outside of the vehicle) of a vehicle door overlooked from the upper left side ahead.

FIG. 1 is a left side view of a vehicle including a door sash according to the embodiment. The front door FD and the rear door RD, each including a door sash 40 (see FIG. 2), are openably and closably installed in a door opening H formed in the vehicle C. The door opening H is an opening formed on a vehicle body B according to an outer shape of the rear door RD.

The vehicle C illustrated in FIG. 1 includes a pair of left and right front doors FD and a pair of left and right rear doors RD. Hereinafter, a configuration of the left front door FD is described as an example.

FIG. 2 is an exploded perspective view (a perspective view from the outside of the vehicle) of a vehicle door overlooked from the upper left side ahead. Illustration of an inner panel and an outer panel is omitted in FIG. 2. First, a door body 10, a door glass 20 and a molding 30 are described briefly, and then the door sash 40 according to the embodiment is described in detail.

Door Body

The door body 10 is a member serving as a backbone of the front door FD, and is installed on a door opening H of the vehicle body B (see FIG. 1). The door body 10 is rotated via a hinge 12 to open and close the front door FD.

The door body 10 comprises metals such as steel and includes a frame 11 and the hinge 12. The frame 11 is formed, for example, by a front frame part 11a and a rear frame part 11b, which extend in the vertical direction, and an upper frame part 11c and a lower frame part 11d, which extend in the horizontal direction. The inner panel (not illustrated) is installed on the right side (vehicle inner side) of the frame 11, and the outer panel (not illustrated) is installed on the left side (vehicle outer side).

The hinge 12 is a member installed for enabling the door body 10 to rotate on the vehicle body B (see FIG. 1).

Door Glass

The door glass 20 has a shape corresponding to the door sash 40 (for example, a triangular window). The door glass 20 includes a door glass 21 attached to the door body 10 in such a manner as to be freely pulled up and down and a door glass 22 (quarter glass) fixed to the door body 10.

The door glass 21 comes into close contact with an inner wall surface of a run channel R (see FIG. 2A) in a closed state, and is pulled up and down by sliding on the run channel R when the wind device (not illustrated) is driven. Also, an auxiliary sash 50 for partitioning the door glasses 21, 22 is provided.

Molding

The molding 30 (decorative member) is a plate member covering a design part 41 (see FIG. 3A) of the door sash 40 from the vehicle outer side. The molding 30 is formed such that an inner wall surface thereof runs along an outer wall surface of the design part 41 in a cross-sectional view.

Door Sash

The door sash 40 is a polygonal line-shaped frame fixed to an upper section of the door body 10 and has a feature of housing an outer peripheral end part of the door glass 20 and holding the run channel R (see FIG. 3A) and a seal member W1. The door sash 40 is manufactured, for example, by roll forming a band-shaped plate material comprising rolled steel sheet, and end portions K1, K2 thereof are joined (welded) to left and right sides M1, M2 of the upper frame part 11c.

Figure 3A:
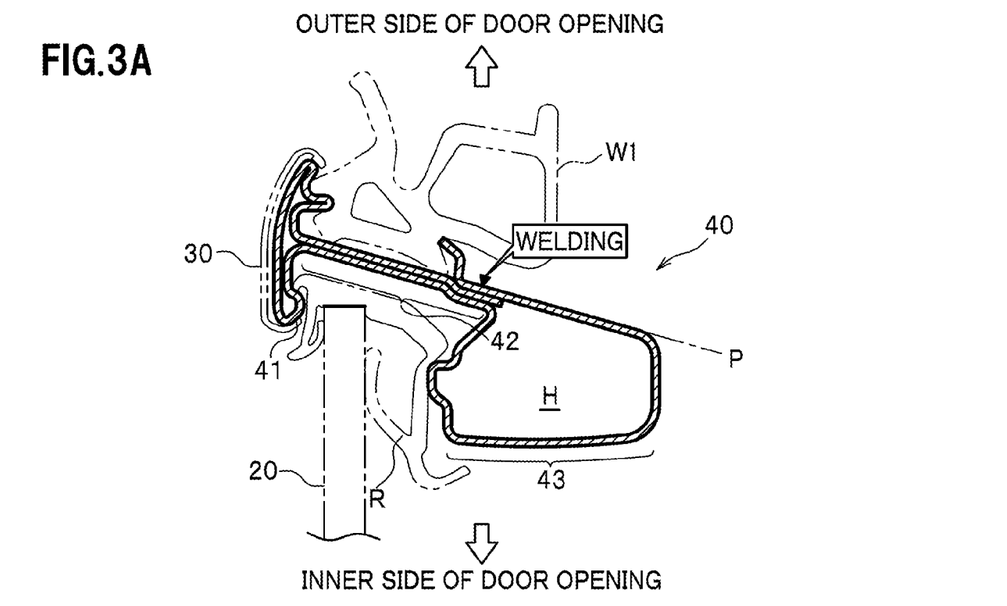
FIG. 3A is an end face view in the arrow direction from the line II-II of FIG. 1.

FIG. 3A is an end face view in the arrow direction from the line II-II of FIG. 1. Illustration of the door body 10 is omitted in FIG. 3A.

The door sash 40 includes the design part 41 with the surface thereof on the vehicle outer side covered with the molding 30 (or exposed), a tubular part 43 that is positioned closer to the vehicle inner side than the design part 41 and that has a closed cross section H, and a connection part 42 that connects the design part 41 and the tubular part 43 with each other.

The embodiment is described on the basis that the design part 41 is covered with the molding 30 (that is, the molding 30 forms a portion of the vehicle outer side wall). However, the configuration may not include the molding 30. In this case, an outer surface of the design part 41 is exposed.

The design part 41 is positioned closer to the vehicle outer side than the connection part 42 and tubular part 43 described later, and includes a sector-shaped closed cross section formed by roll forming. An end portion of design part 41 on the vehicle inner side is continuous to the connection part 42.

When the run channel R and the seal member W1 are fixed, the connection part 42 serves as a bottom wall with which end faces of those members are brought into contact. The connection part 42 extends in inward and outward directions of the vehicle C from the design part 41, and an end portion thereof on the vehicle inner side is continuous to the tubular part 43.

The run channel R is an elastic member for sealing between the door glass 20 and the door sash 40. The seal member W1 is an elastic member for sealing between the front door FD and the vehicle body B.

The connection part 42 is formed by closely attaching two layers of the plate material (one sheet of the plate material overlapped in two layers) continuous to the design part 41 when roll forming one sheet of the plate material. In a section which is close to the tubular part 43 and where the plate material is overlapped in three layers, only a portion where the plate material is overlapped in two layers inside the door opening H corresponds to the connection part 42.

Here, the "inner side of the door opening H" is synonymous with a center side of the front door FD. For example, in the section of the line II-II illustrated in FIG. 1, the lower side thereof corresponds to the inner side of the door opening H. In the section of the line IV-IV illustrated in FIG. 1, the rear side thereof corresponds to the inner side of the door opening H.

Figure 3B:
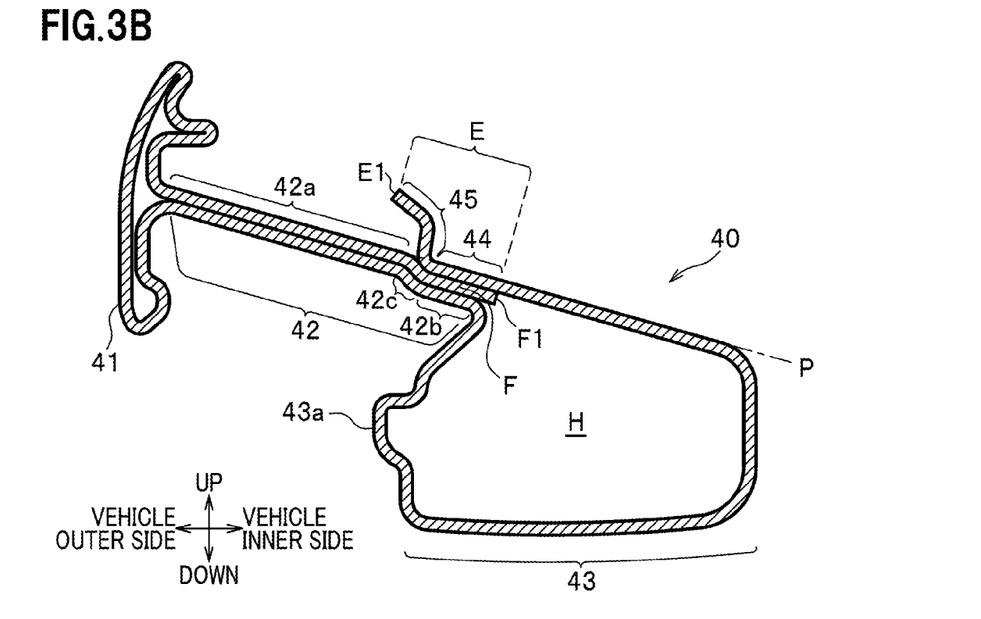
FIG. 3B is an end face view of a door sash extracted from FIG. 3A.

FIG. 3B is an end face view of the door sash that is solely extracted from the view of FIG. 3A.

The connection part 42 illustrated in FIG. 3B includes a first connection part 42a continuous to the design part 41, a second connection part 42b continuous to the tubular part 43, and a stepped part 42c provided between the first connection part 42a and the second connection part 42b.

The first connection part 42a serves as a bottom wall for housing the run channel R and the seal member W1.

The second connection part 42b is a section where "vicinity of one end E of plate material" is overlapped in a cross-sectional view. Here, "vicinity of one end E of plate material" corresponds to an overlapping part 44 and a locking part 45, which are described later. One end E1 of the plate material corresponds to a tip of the locking part 45 described later.

The second connection part 42b extends substantially in parallel with the first connection part 42a in a cross-sectional view and is positioned closer to the inner side of the door opening H than the first connection part 42a. That is, the first connection part 42a and the second connection part 42b have a step difference therebetween via the stepped part 42c in a cross-sectional view.

The second connection part 42b is formed by overlapping a plate material being continuous to the tubular part 43 and positioned in the innermost of the door opening H and "vicinity of another end F of plate material" with each other. The "vicinity of the other end F of plate material" is continuous to another end F1 facing the closed cross section H of the tubular part 43, and is a section where the overlapping part 44 is overlapped from the outer side of the door opening H.

The stepped part 42c is provided between the first connection part 42a and the second connection part 42b and has a feature of absorbing a pressing force acting on the vehicle outer side from the vehicle body B along with the tubular part 43. The stepped part 42c forms an angle (for example, more than 90 degrees and less than 180 degrees), predetermined in consideration of easiness of roll forming and rigidity of the door sash 40, with respect to the first connection part 42a and second connection part 42b.

The stepped part 42c is formed such that the surface of the second connection part 42b is positioned closer to the inner side of the door opening H by one sheet of the plate material than the surface of the first connection part 42a. In other words, with the plate material overlapped on the first connection part 42a, the stepped part 42c is formed such that the surface of the plate material (overlapping part 44) and the surface of the first connection part 42a are flush with each other along the plane P.

The overlapping part 44 is a section of the "vicinity of one end of plate material" which is overlapped on the second connection part 42b from the outside. As illustrated in FIG. 3B, by overlapping the overlapping part 44 and the section connection part 42b to each other, the surface of the overlapping part 44 and the surface of the first connection part 42a become flush with each other along the plane P.

Figure 5:
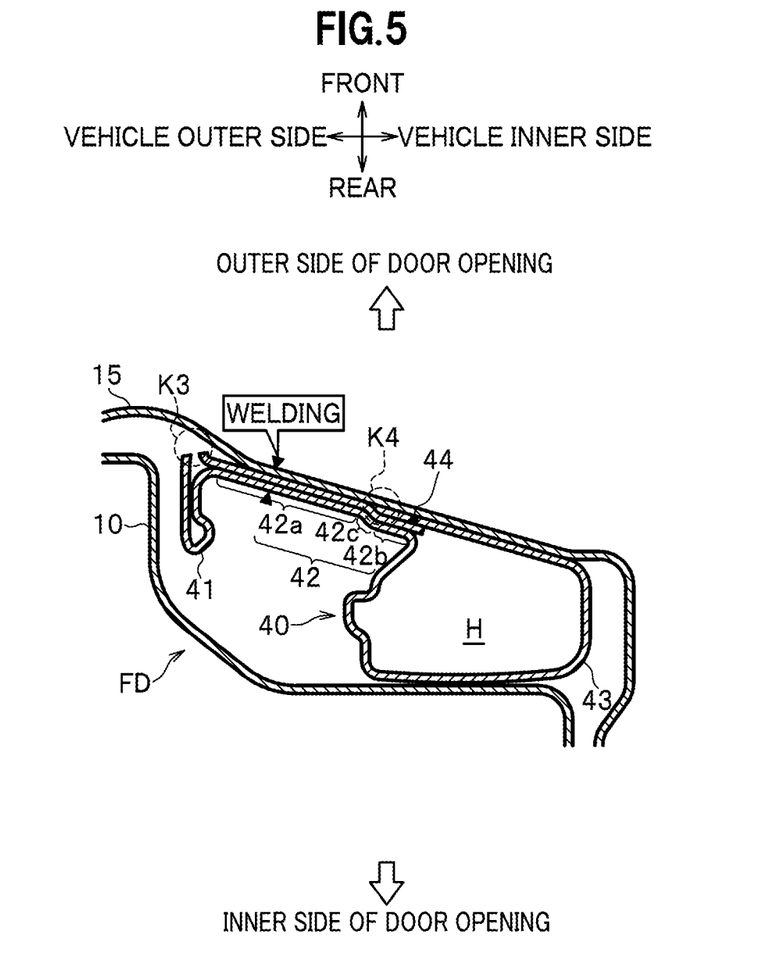
FIG. 5 is an end face view in the arrow direction from the line V-V of FIG. 1, illustrating a closed vehicle door.

Out of the door sash 40 extending in a zig-zag manner in a side view, a portion of the design part 41 and the locking part 45 interfering with an inner panel 15 in the vicinity of end portions K1, K2 (see FIG. 2) are cut off (see K3, K4 of FIG. 5). Since the surface of the overlapping part 44 and the surface of the first connection part 42a are flush with each other, the door sash 40 and the inner panel 15 can be joined to each other in a simple manner by closely attaching the door sash 40 to the inner panel 15 just by the cutting.

As illustrated in FIG. 3B, an end portion of the overlapping part 44 on the vehicle outer side continuous to the locking part 45 abuts on the stepped part 42c. Thus, when the door body 10 is closed, a reaction force received from the seal member W1 on the vehicle inner side is absorbed by the tubular part 43 and the stepped part 42c, and thereby rigidity of the door sash 40 can be enhanced.

As indicated by a triangular mark of FIG. 3A, in this embodiment, a section in which three layers including the overlapping part 44 are overlapped is joined, for example, by laser welding. Thus, when manufacturing the door sash 40, vicinities of both ends of the plate material can be fixed by one joining operation.

The tubular part 43 illustrated in FIG. 3B is provided to secure rigidity of the door sash 40 and is disposed so as to come into close contact with the seal member W2 (see FIG. 4) on the side of the vehicle body B when the front door FD is closed. The tubular part 43 has a D-shaped closed cross section H and is continuous to a plate material of the second connection part 42b disposed inside the door opening H and the overlapping part 44.

A "housing part" having a U-shape in a cross-sectional view in which the run channel is housed is formed by the wall part 43a of the tubular part 43 on the vehicle outer side, the connection part 42 and the design part 41.

The tubular part 43 includes a projecting part 43a that projects closer to the design part 41 (vehicle outer side) than another end F1 of the plate material. Thus, the cross section area (section modulus) of the tubular part 43 can be increased and thereby impact resistance of the tubular part 43 can be enhanced. A space for holding the run channel R by the "housing part" can be secured by adjusting a projecting extent of the projecting part 43a toward the design part 41 as appropriate.

The tubular part 43 is roll formed so as to have a D-shaped closed cross section H and is formed such that the outer surface of the door opening H is substantially flush with the surface of the overlapping part 44 (along a plane P). Thus, a wide area can be provided where the door sash 40 comes into close contact with the inner panel 15, and this facilitates attaching of the door sash 40.

The locking part 45 is continuous to the overlapping part 44 at a base end thereof and extends toward the outer side of the door opening H. As described above, a tip of the locking part 45 in a cross-sectional view faces one end E1 of the plate material. The locking part 45 is formed to lock the seal member W1 together with the design part 41.

Figure 4:
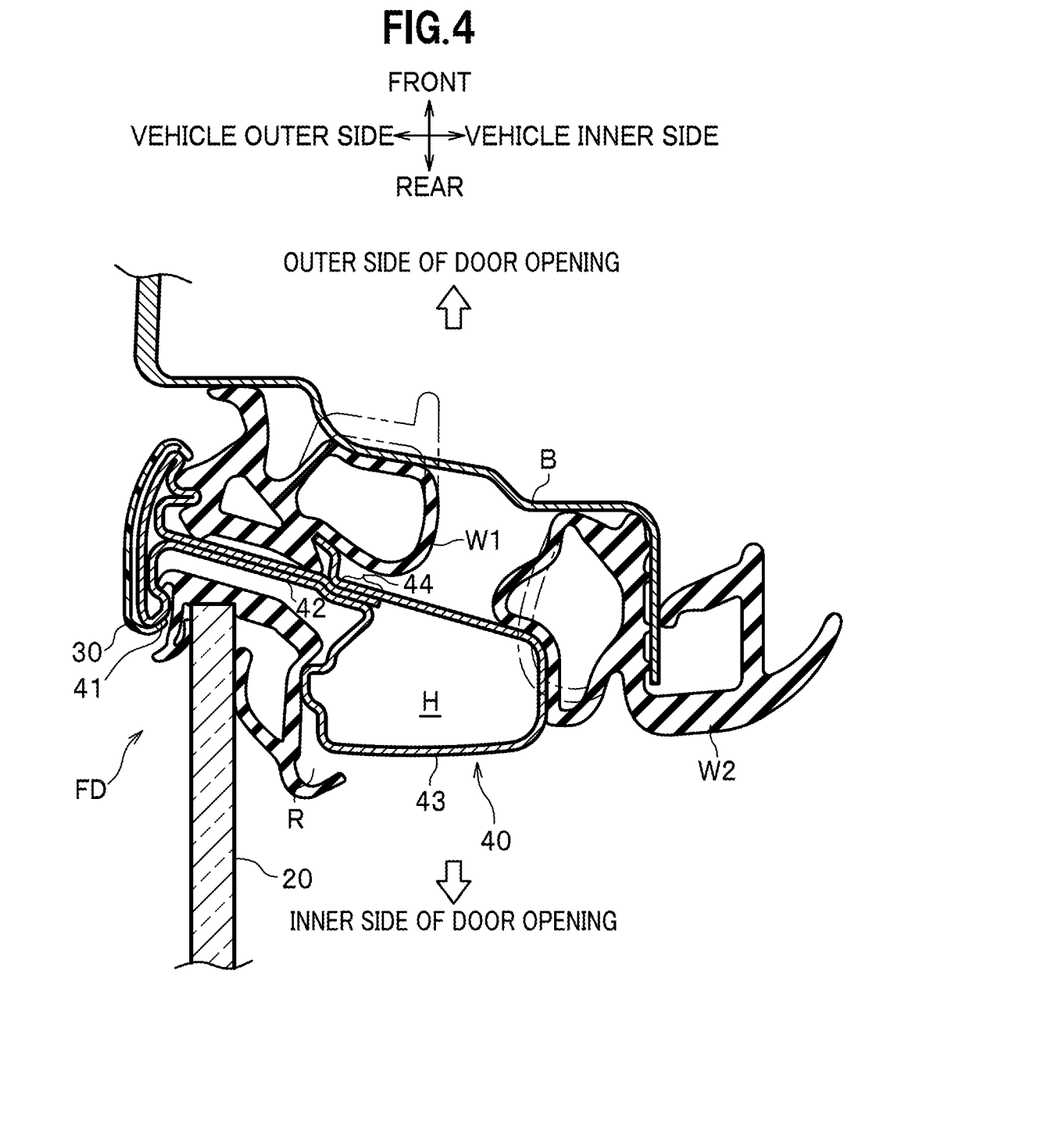
FIG. 4 is an end face view in the arrow direction from the line IV-IV of FIG. 1, illustrating a closed vehicle door.

FIG. 4 is an end face view in the arrow direction from the line IV-IV of FIG. 1, illustrating a closed state of the vehicle door. A cut surface including the line IV-IV of FIG. 1 is positioned above a section where the door sash 40 is joined to the door body 10. As illustrated in FIG. 4, the vehicle body B is provided with a seal member W2 configured to elastically deform when pressed by the tubular part 43 and thereby seal between the vehicle body B and the front door FD.

As described above, a large cross section area of the tubular part 43 ensures sufficient rigidity of the tubular part 43. A pressing force from the tubular part 43 toward the vehicle inner side is absorbed by the seal member W2. An end portion of the overlapping part 44 on the vehicle outer side abuts on the stepped part 42c (see FIG. 3B). Thus, the pressing force is received by the wall surface (mostly facing the vehicle inner side) of the stepped part 42c, and thereby rigidity of the door sash 40 can be enhanced.

FIG. 5 is an end face view in the arrow direction from the line V-V of FIG. 1, illustrating a closed state of the vehicle door. A cut surface including the line V-V of FIG. 1 corresponds to a section (K1 indicated in FIG. 2) where the door sash 40 is welded to the door body 10.

As indicated by K3 and K4 of FIG. 5, a section interfering with the inner panel 15 (a portion of the design part 41, and the locking part 45: see FIGS. 3A and 3B) out of both ends of the door sash 40 having a polygonal line-shape in a side view is cut in advance. End portions of the molding 30, run channel R, seal member W1, and so on are disposed above a cross section illustrated in FIG. 5.

A plate-shaped reinforcing member 15 is installed on the door sash 40 on the inner side of the vehicle opening (reinforcing member 15 is omitted in FIG. 2).

As illustrated in FIG. 5, the outer surface of the door opening H is substantially flush with the first connection part 42a, overlapping part 44 and tubular part 43. Thus, the door sash 40 and the inner panel 15 can be brought into close contact with each other by pressing the door sash 40 to the inner panel 15, and spot welding can be performed in that state (see a triangular mark of FIG. 5).

Manufacturing Process of Door Sash

Next, manufacturing process of the door sash 40 is described briefly.

First, a plate material is fed out by an uncoiler apparatus (not illustrated) from a coil of a band-shaped plate material wound in a roll shape in advance, and one sheet of the plate material is formed by multiple pairs of forming rollers (not illustrated). The forming rollers are arranged in multiple stages in the direction where the plate material is fed, and is disposed by facing each other with the plate material therebetween.

As the plate material is fed by a feeding device (not illustrated), forming by the forming rollers is in progress, and the cross section shape of the plate material gets closer to a cross section shape illustrated in FIG. 3B (forming process).

In the forming process, the plate material is formed such that the first connection part 42a and the second connection part 42b have a step difference therebetween via the stepped part 42c. The plate material is formed such that the outer surface of the door opening H is substantially flush with the first connection part 42a, the overlapping part 44 and the tubular part 43.

When a predetermined section close to one end E1 of the plate material illustrated in FIG. 3B is pressed to the first connection part 42a (that is, when an end of the overlapping part 44 on the vehicle outer side is brought into contact with the stepped part 42c), the plate material deforms itself and warps by a drag force received from the stepped part 42c. Further, the locking part 45 is formed with the warping direction guided by the forming rollers. Thus, a base end of the locking part 45 can be easily positioned by providing the stepped part 42c.

Then, a section where the overlapping part 44 is overlapped on the second connection part 42b indicated by a triangular mark of FIG. 3A is welded by the laser welding machine (not illustrated) (welding process). That is, a section where the second connection part 42*b* and overlapping part 44 are overlapped with each other is continuously welded in a direction where the door sash 40 extends. Thus, in this embodiment, manufacturing process can be simplified as one section is welded when manufacturing the door sash 40.

After the welding process, the plate material is cut by a cutting machine (not illustrated) and separated from an upstream plate material (cutting process). Further, a section (a portion of the design part 41 and the locking part 45: see K3, K4 of FIG. 5) interfering with the inner panel 15 of the vehicle body B in vicinities of both ends of the separated plate material is removed. Thus, the door sash 40 is manufactured.

Attaching Process of Door Sash

The door sash 40 is held, for example, by a multi-axes articulated robot (not illustrated), and vicinities of both ends thereof in a side view (K1, K2 of FIG. 2) are welded to the inner panel 15. Wall surfaces of the connection part 42*a*, overlapping part 44 and tubular part 43 illustrated in FIG. 5 are pressed onto the inner panel 15 from the inner side of the door opening H, and thereby the door sash 40 comes into close contact with the inner panel 15. With these brought in close contact with each other, spot welding is performed with both sides of the door sash 40 and inner panel 15 held by electrodes of a spot welding machine (not illustrated). Thus, the door sash 40 is attached to the inner panel 15.

Advantageous Effects

In the door sash 40 according to the embodiment, the second connection part 42*b* is positioned closer to the inner side of the door opening H than the first connection part 42*a*, and the surface of the overlapping part 44 is flush with the surface of the first connection part 42*a*.

Therefore, the overlapping part 44 does not become an obstacle when welding the first connection part 42*a* by pressing onto the inner panel 15 (see FIG. 5). That is, the first connection part 42*a* and inner panel 15 can be welded with these brought in close contact with each other, and thereby the number of processing steps and costs can be reduced.

Also, the door sash 40 and the inner panel 15 can be brought into close contact with each other easily just by cutting a portion (a portion of the design part 41, and locking part 45) interfering when joining the door sash 40 and inner panel 15 to each other.

Figure 8A:
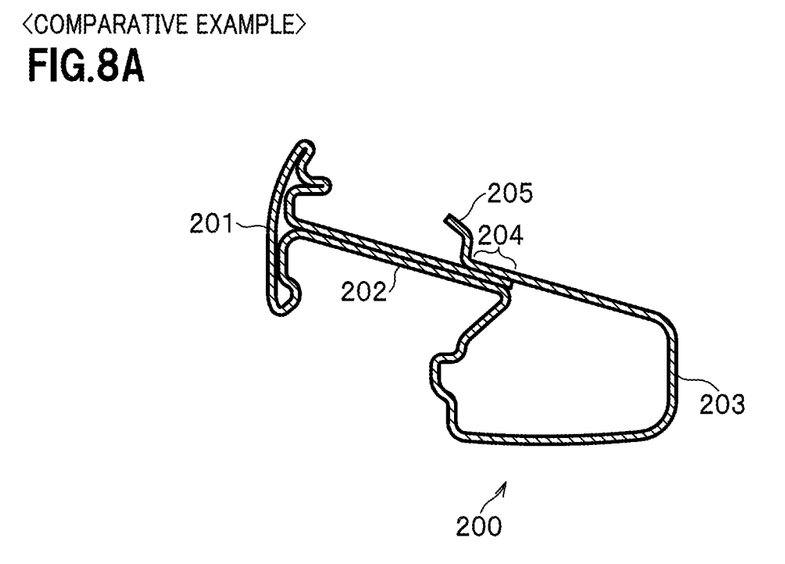
FIG. 8A is an end face view of a door sash according to a comparative example.

FIG. 8A is an end face view of a door sash according to a comparative example. A door sash 200 illustrated in FIG. 8A is formed by roll forming one sheet of the plate material and includes a design part 201, a connection part 202 and a tubular part 203.

Compared with the embodiment, the door sash 200 according to the comparative example does not include the stepped part 42*c* (see FIG. 3B). That is, the connection part 202 extends linearly in a cross-sectional view, and the overlapping part 204 is overlapped on the connection part 202.

Figure 8B:
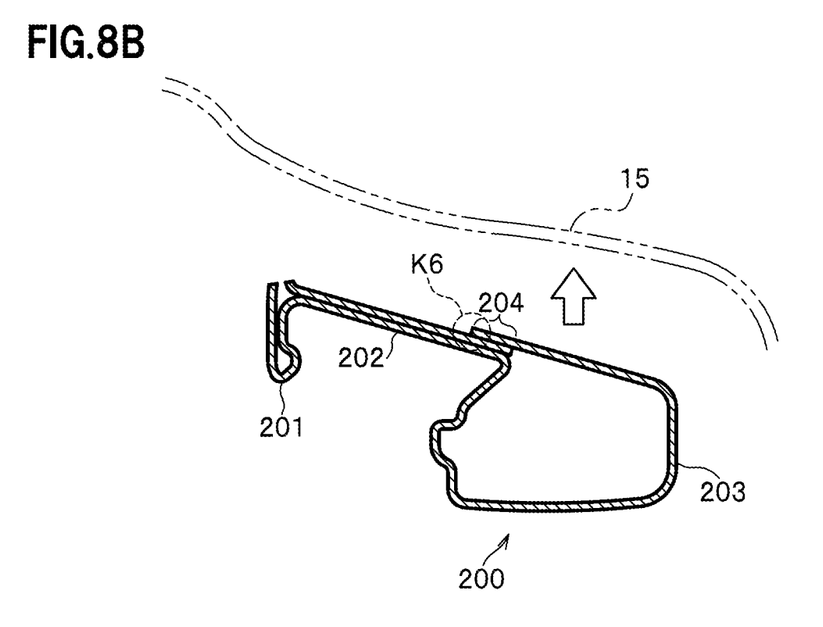
FIG. 8B is an end face view of the door sash illustrated in FIG. 8A with a portion of the design part and the locking part cut off therefrom.

If a portion (a portion of the design part 201, and the locking part 205) interfering with the inner panel 15 is cut for welding the door sash 200 of the comparative example to the inner panel 15, a step difference indicated by K6 of FIG. 6B is formed. Therefore, in order to closely attach the inner panel 15 and the door sash 200 to each other, for example, at least one of these must be subjected to the stamp processing.

Thus, the comparative example requires additional processing steps and costs. Meanwhile, according to the embodiment, the door sash 40 and inner panel 15 can be brought into close contact with each other without performing the additional processing, and thereby costs and the number of processing steps for installation can be reduced.

Second Embodiment

A door sash 40A according to the second embodiment (see FIG. 6) is different from the door sash according to the first embodiment in that a plate material overlapped in two layers in a cross-sectional view of the first connection part 42*a* is branched from an end portion of the stepped part 42*c* on the vehicle outer side and is continuous to the tubular part 43. Therefore, the different portion is described, and description of portions duplicating the first embodiment is omitted.

Figure 6:
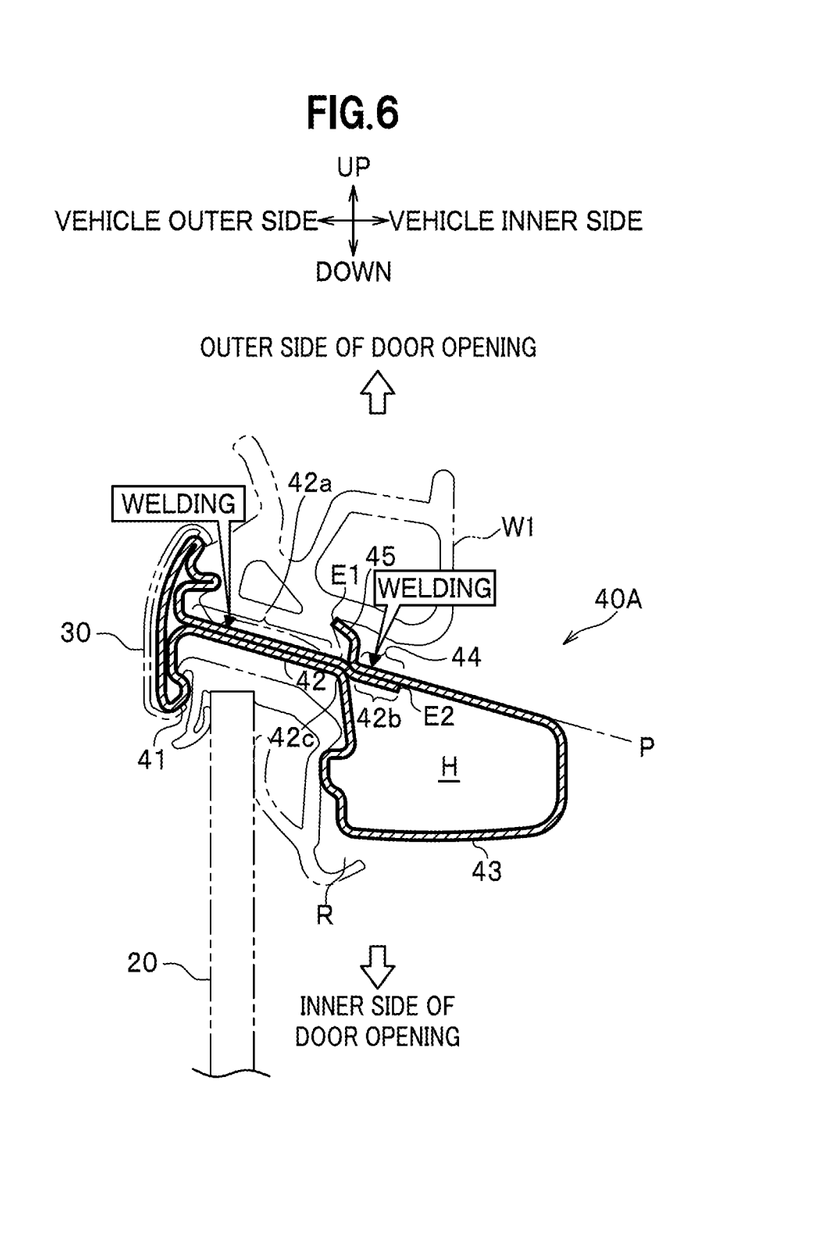
FIG. 6 is an end face view in the arrow direction from the line II-II of FIG. 1 relative to a door sash according to a second embodiment of the present invention.

FIG. 6 is an end face view in the arrow direction from the line II-II of FIG. 1 relative to a door sash according to the embodiment. A roll formed plate material forms an overlapping part 44 and a locking part 45 at the vicinity of one end thereof, and a second connection part 42*b* at the vicinity of the other end F thereof.

As described above, the plate material overlapped in two layers in a cross-sectional view of the first connection part 42*a* is branched from an end portion of the stepped part 42*c* on the vehicle outer side and is continuous to the tubular part 43. That is, the "vicinity of the other end of plate material" extends to the inside of a closed cross section H included in the tubular part 43 and faces the inside.

"Vicinity of one end of plate material" includes the door sash 40 and the overlapping part 44. The overlapping part 44 is overlapped on the second connection part 42*b* from the outer side of the door opening H, is bent while being pressed onto the stepped part 42*c*, and is continuous to the locking part 45. That is, in the first embodiment, the second connection part 42*b* is formed in two layers in a cross-sectional view, whereas in this embodiment, the second connection part 42*b* is formed in one layer (one sheet of plate material) in a cross-sectional view.

The second connection part 42*b* is positioned closer to the inner side of the door opening H than the first connection part 42*a*. Then, "vicinity of one end of plate material" (overlapping part 44 and locking part 45) is overlapped from the outer side of the door opening H to form the tubular part 43.

When manufacturing the door sash 40A, a predetermined section of the first connection part 42*a* and overlapping part 44 are laser-welded respectively as indicated by a triangular mark of FIG. 6. Then, portions of the first connection part 42*a*, overlapping part 44 and tubular part 43, which are flush with each other along a plane P, are spot welded to the inner panel 15.

Advantageous Effects

In the configuration according to this embodiment, the plate material is branched from an end portion of the stepped part 42*c* on the vehicle outer side and is continuous to the tubular part 43. Therefore, a larger area can be secured for the closed cross section H of the tubular part 43 than the first embodiment. Thus, rigidity of the door sash as a whole can be enhanced.

Also, some laser welding machines can be used for welding a plate material overlapped in two layers, but not for welding a plate material overlapped in three or more layers. In this embodiment, the plate material is formed in two layers in a cross-sectional view of two welding sections. Therefore, the plate material can be welded in an appropriate manner even when laser welding machines mentioned above are used.

Modified Example

The door sash 40, and so on according to the present invention is described above by referring to the embodiments. However, the present invention is not limited thereto and may be modified in various ways.

Figure 7:
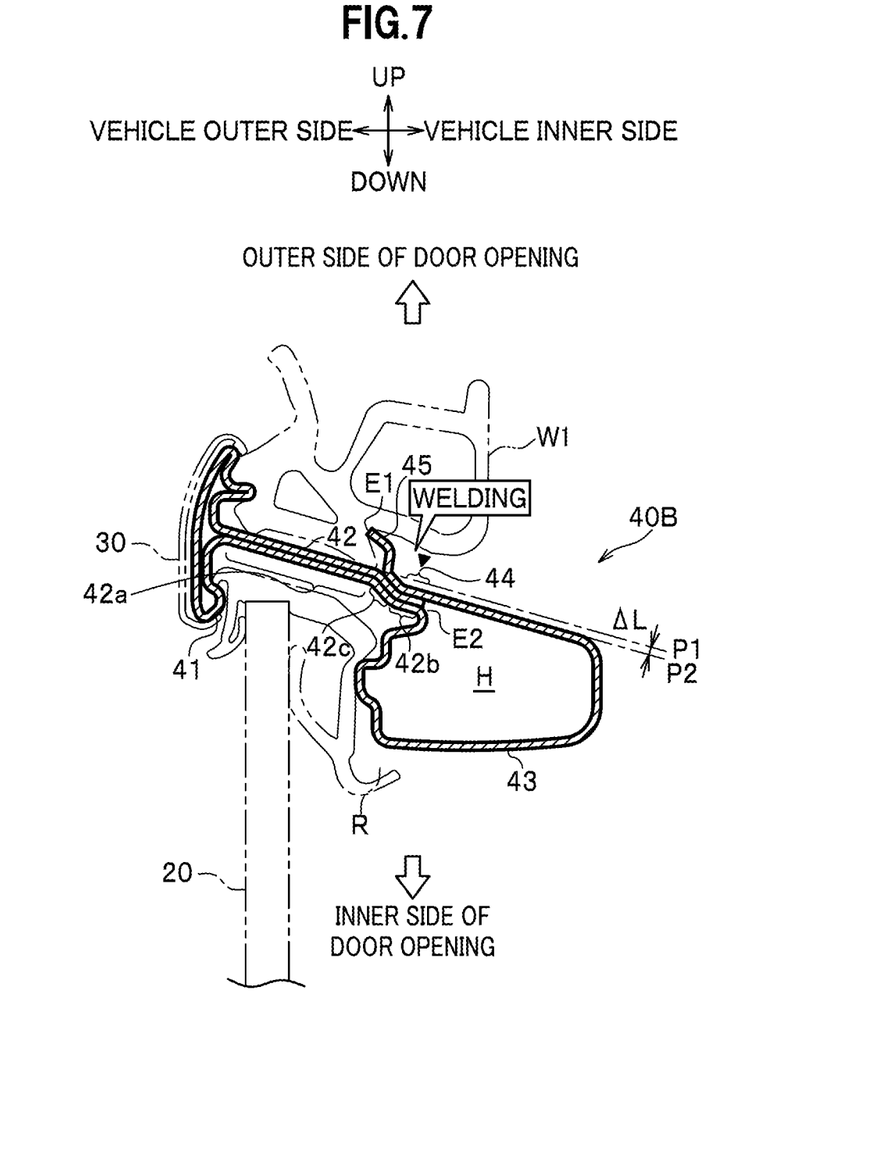
FIG. 7 is an end face view in the arrow direction from the line II-II of FIG. 1 relative to a door sash according to a modified example of the present invention.

FIG. 7 is an end face view in the arrow direction from the line II-II of FIG. 1 relative to a door sash according to a modified example of the present invention. The configuration illustrated in FIG. 7 is different from the first embodiment in the overlapping part 44 and the tubular part 43 where an outer surface of the door opening H is positioned closer to the inner side of the door opening H by a distance ΔL from a plane P1 along the first connection part 42a. Other members of the configuration are the same as the first embodiment.

After joining the overlapping part 44 and second connection part 42b to each other when manufacturing the door sash 40B, end portions (see FIG. 5) with a portion of the design part 41 and the locking part 45 removed are welded to the inner panel 15. In this event, since the first connection part 42a and the inner panel are in close contact with each other, welding operation can be performed smoothly. The configuration of FIG. 7 may be applied to the door sash 40A according to the second embodiment.

In the first embodiment, the connection part 42 is formed by a plate material overlapped in two layers in a cross-sectional view, and the tubular part 43 is formed by overlapping the overlapping part 44 on the second connection part 42b out of the connection part 42. However, the present invention is not limited thereto.

That is, the number of sheets of the plate material overlapped in a cross-sectional view may be changed as appropriate such that the surface of the overlapping part 44 is positioned closer to the inner side of the door opening H than the surface of the first connection part 42a (or flush with the surface of the first connection part 42a).

In the embodiments described above, the front door FD and rear door RD (see FIG. 1) including the door sash 40 are hinge type doors. However, the present invention is not limited thereto.

For example, a slide type door may be used as the vehicle front door FD and rear door RD.

REFERENCE SIGNS LIST

C vehicle
B vehicle body
FD front door (vehicle door)
RD rear door (vehicle door)
10 door body
20 door glass
30 molding (decorative member)
40, 40A, 40B door sash
41 design part
42 connection part
42a first connection part
42b second connection part
42c stepped part
43 tubular part
43a projecting part
44 overlapping part
45 locking part
43a wall part
H closed cross section
R run channel
E vicinity of one end
F vicinity of another end

The invention claimed is:

1. A door sash attached to a door body openably and closably installed on a door opening of a vehicle body and formed of one sheet of a plate material, comprising:
a design part having a surface on a vehicle outer side exposed or covered with a decorative member;
a tubular part positioned closer to a vehicle inner side than the design part, the tubular part having a closed cross section; and
a connection part connecting the design part and the tubular part with each other, wherein
the connection part includes
a first connection part continuous to the design part,
a second connection part continuous to the tubular part, and
a stepped part provided between the first connection part and the second connection part,
the second connection part is positioned closer to an inner side of the door opening than the first connection part,
a vicinity of one end of the plate material in a cross-sectional view includes an overlapping part forming the closed cross section by overlapping on the second connection part from an outer side of the door opening, and
a surface of the overlapping part is positioned closer to the inner side of the door opening than a surface of the first connection part, or flush with the surface of the first connection part.

2. The door sash according to claim 1, wherein an end portion of the overlapping part on a vehicle outer side abuts on the stepped part.

3. The door sash according to claim 1, wherein the vicinity of one end of the plate material in the cross-sectional view is joined to the second connection part, and is not joined to the first connection part.

4. The door sash according to claim 1, wherein
the second connection part includes a vicinity of another end of the plate material, and
a section where the vicinity of the other end and the overlapping part are overlapped with each other is joined.

5. The door sash according to claim 4, wherein
the vicinity of the other end of the plate material extends to the inside of the closed cross section of the tubular part, and
a section where the vicinity of the other end and the overlapping part are overlapped with each other is joined.

6. The door sash according to claim 4, wherein
the second connection part further includes the plate material continuous to the tubular part with the vicinity of the other end therebetween along with the overlapping part, and
a section where at least three layers including the overlapping part are overlapped with each other is joined.

7. The door sash according to claim 6, wherein
a housing part having a U-shape in the cross-sectional view for housing a run channel is formed by a wall part of the tubular part on the vehicle outer side, the connection part, and the design part, and
the tubular part projects closer to the design part than the vicinity of the other end of the plate material.

8. The door sash according to claim 2, wherein the vicinity of one end of the plate material in the cross-sectional view is joined to the second connection part, and is not joined to the first connection part.

9. The door sash according to claim 2, wherein
the second connection part includes a vicinity of another end of the plate material, and
a section where the vicinity of the other end and the overlapping part are overlapped with each other is joined.

10. The door sash according to claim 9, wherein
the vicinity of the other end of the plate material extends to the inside of the closed cross section of the tubular part, and
a section where the vicinity of the other end and the overlapping part are overlapped with each other is joined.

11. The door sash according to claim 9, wherein
the second connection part further includes the plate material continuous to the tubular part with the vicinity of the other end therebetween along with the overlapping part, and
a section where at least three layers including the overlapping part are overlapped with each other is joined.

12. The door sash according to claim 11, wherein
a housing part having a U-shape in the cross-sectional view for housing a run channel is formed by a wall part of the tubular part on the vehicle outer side, the connection part, and the design part, and
the tubular part projects closer to the design part than the vicinity of the other end of the plate material.

13. The door sash according to claim 3, wherein
the second connection part includes a vicinity of another end of the plate material, and
a section where the vicinity of the other end and the overlapping part are overlapped with each other is joined.

14. The door sash according to claim 13, wherein
the vicinity of the other end of the plate material extends to the inside of the closed cross section of the tubular part, and
a section where the vicinity of the other end and the overlapping part are overlapped with each other is joined.

15. The door sash according to claim 13, wherein
the second connection part further includes the plate material continuous to the tubular part with the vicinity of the other end therebetween along with the overlapping part, and
a section where at least three layers including the overlapping part are overlapped with each other is joined.

16. The door sash according to claim 15, wherein
a housing part having a U-shape in the cross-sectional view for housing a run channel is formed by a wall part of the tubular part on the vehicle outer side, the connection part, and the design part, and
the tubular part projects closer to the design part than the vicinity of the other end of the plate material.

* * * * *